(No Model.)

W. A. NAYLOR.
FODDER DISINTEGRATING MACHINE.

No. 264,740. Patented Sept. 19, 1882.

Witnesses.
Jas. E. Hutchinson
Robert Everett

Inventor.
Wm. A. Naylor,
By his Attorney,
James L. Norris.

UNITED STATES PATENT OFFICE.

WILLIAM A. NAYLOR, OF LAMBERTVILLE, NEW JERSEY.

FODDER-DISINTEGRATING MACHINE.

SPECIFICATION forming part of Letters Patent No. 264,740, dated September 19, 1882.

Application filed May 22, 1882. (No model.)

*To all whom it may concern:*

Be it known that I, WILLIAM A. NAYLOR, a citizen of the United States, residing at Lambertville, Hunterdon county, New Jersey, have invented new and useful Improvements in Machines for Disintegrating Fodder, of which the following is a specification.

This invention relates to improvements in that class of machines for disintegrating fodder which are composed of rotary cylinders and fixed concaves, both armed with teeth, the fodder being acted on by the teeth in the space between the cylinder and the concave.

The object of my invention is to provide a machine wherein the fodder will be more thoroughly subdivided, broken, or disintegrated than in machines as heretofore constructed; and to such end my invention consists in the construction of the teeth and their arrangement on the concave, so that the teeth of the latter will all present a vertically-arranged square or blunt end to the fodder, and likewise the teeth of the cylinder will present radially-arranged square or blunt ends thereto, the parts so coacting as to thoroughly and effectively break up and disintegrate the fodder, even if the latter be moist or damp, which cannot be as efficiently done in machines having sharp or pointed teeth all radially arranged, as heretofore.

Figure 1:
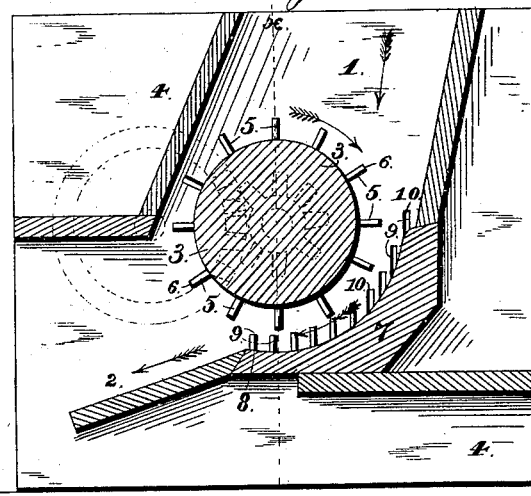
Figure 2:
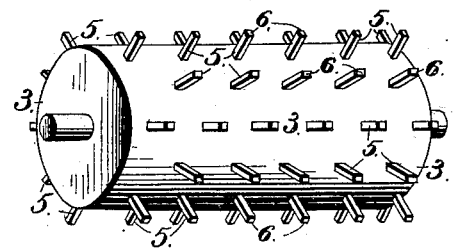
Figure 2:
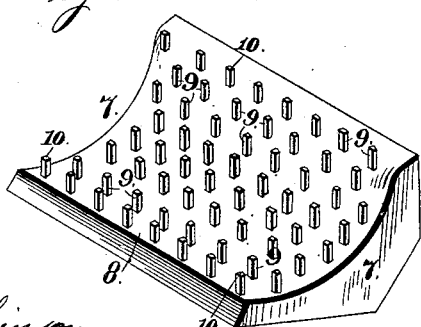

My invention is clearly illustrated in the accompanying drawings, in which Figure 1 represents a vertical central sectional view of a machine embodying my invention; and Fig. 2, perspective views of the cylinder and concave, detached.

The frame of the machine may be of any usual construction, with a hopper, 1, to receive the fodder, and an inclined chute, 2, for the disintegrated material to be discharged from the machine. The rotary cylinder 3 is journaled in the side walls, 4, and its surface is furnished with rows of radially-arranged studs 5, having square or blunt outer ends, 6, said studs being preferably of steel, which can be easily driven into the cylinder, if the latter is of wood. The concave 7 is secured below the cylinder, so as to partially encircle the same, and its lower edge, 8, is arranged flush with the upper edge of the inclined delivery chute or board 2, so as to provide efficient means for the ready and smooth discharge of the material. The upper surface of the concave is furnished with a series of studs, 9, which are so attached to the concave that they all stand vertical throughout the concave with respect to a vertical line, $x\ x$, taken through the cylinder, as at Fig. 1. The upper end of each stud is square or blunt, as at 10, and by this vertical or upright arrangement of the studs each and every one presents a vertically-arranged square or blunt end to the fodder throughout the entire operation of grinding or disintegrating the fodder, whereby I am enabled to thoroughly break, subdivide, or disintegrate the fodder in a rapid and efficient manner, even though the same be moist or damp. The cylinder and concave are so disposed or arranged in relation to each other that the square or blunt ends of the respective studs are almost in contact, only sufficient space being left to permit the cylinder to revolve without liability of the studs thereon striking those on the concave.

The construction and arrangement described I have found in practice produces a more thorough, rapid, and effective breaking up or disintegration of the fodder, especially if the latter be damp or moist, than in those machines where teeth on both the concave and cylinder are arranged radially and provided with sharpened ends.

An important advantage obtained by arranging the studs on the concave in straight vertical lines, as set forth, is that the force of the disintegrating action is received entirely in the direction of the length of the studs, whereby the durability of the structure is increased, as it is well known that the teeth on the concave are subjected to greater force and pressure than those on the cylinder; hence the desirability of increasing the strength of that part of the structure most subjected to strain.

What I claim is—

1. The concave provided with the studs 9, all projecting therefrom in substantially straight vertical lines with respect to a vertical line through the center of the rotary cylinder, as and for the purpose set forth.

2. The combination, with the rotary cylinder provided with the radial studs 5, having square or blunt ends 6, of the concave 7, provided with the studs 9, having square or blunt ends and all projecting from the concave in straight vertical lines substantially parallel to a vertical line through the center of the cylinder, substantially as described.

In testimony whereof I have hereunto set my hand in the presence of two subscribing witnesses.

WILLIAM A. NAYLOR.

Witnesses:
J. H. BERGER,
STACY B. BRAY.